Jan. 15, 1963 W. W. PETRYK 3,073,437
FLUIDIZED BED PACKAGE
Filed Dec. 30, 1960

INVENTOR
WILLIAM W. PETRYK
BY
Carpenter, Abbott, Coulter & Kinney
ATTORNEYS

United States Patent Office 3,073,437
Patented Jan. 15, 1963

3,073,437
FLUIDIZED BED PACKAGE
William W. Petryk, White Bear Township, Ramsey County, Minn., assignor to Minnesota Mining and Manufacturing Company, St. Paul, Minn., a corporation of Delaware
Filed Dec. 30, 1960, Ser. No. 79,840
4 Claims. (Cl. 206—46)

This invention relates to a package article, and more particularly, to a unitary package article adapted to be converted rapidly into a fluidized bed for use in coating heated articles by a dipping technique.

The coating of articles such as metal fittings, hardware items, panels, door hinge pins, plumbing parts, etc., with protective coatings by using fluidized bed techniques is an operation considered rather simple to accomplish, and one considered suitable for small manufacturers to use without extraordinary capital investment. However, small manufacturers have many times been reluctant to start using fluidized bed coating techniques because of the problem of acquiring and setting up the necessary apparatus as well as obtaining the proper resin particulate for use in fluidized bed coating using that apparatus. Cost of existing metal aerator apparatus for use in fluidized bed coating even becomes a factor, particularly when the contemplated coating operation is very small and the question of whether fluidized bed coating will indeed be satisfactory is unresolved.

This invention obviates such problems for the small manufacturer and provides the art with an extraordinarily economical unitary package article convertible to form a fluidized bed within minutes after opening the package. In a single package, the small manufacturer or potential customer interested in testing fluidized bed coating techniques is provided with all the essential materials and elements for use in determining whether fluidized bed coating will solve his coating problems. Many additional advantages and benefits of the invention will be evident as this description proceeds.

Figure 1:
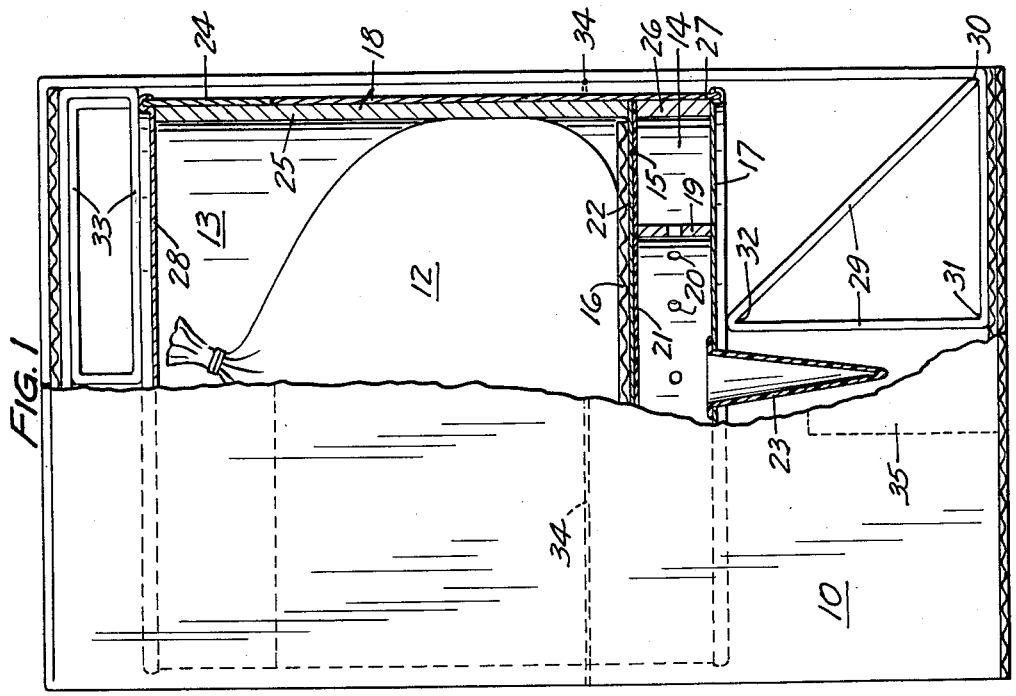
Figure 2:
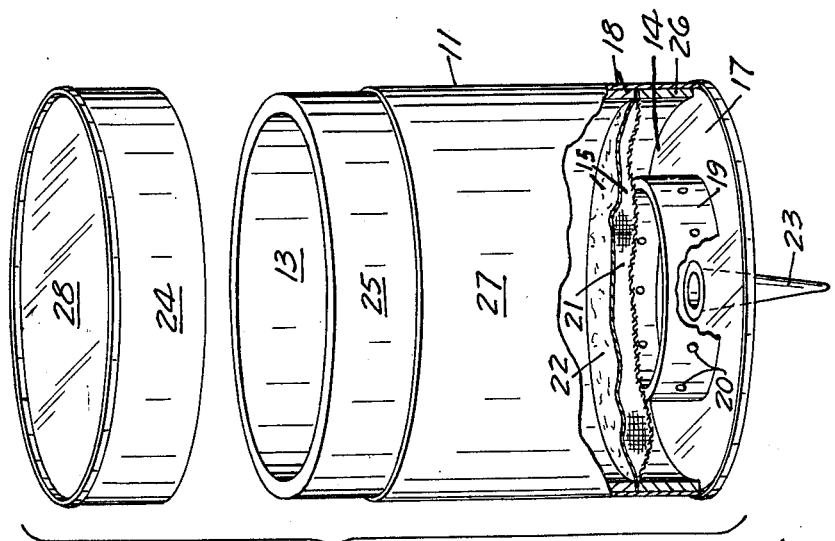

The invention is described by reference to a drawing, made a part hereof, wherein:

FIGURE 1 is a side elevation partially in cross section of a unitary package article of the invention; and FIGURE 2 is a perspective view of an aerator container, partially broken away to show details of structure.

As may be observed from the drawing, the unitary package article of the invention comprises an outer carton 10, an inner container 11, and a bag 12 of fluidizable finely-divided heat-fusible particles.

The bag 12 holding the heat-fusible particles in the composite package as it is supplied in commerce may suitably be formed of plastic film material such as polyethylene, polypropylene, polyethylene terephthalate, etc. The fluidizable particles in the bag must be fusible and uncured so that when a heated object is dipped in a fluidized bed of them, it will pick up a deposit of the particles and the heat of the article will cause the particles to melt and coalesce into a smooth uniform coating. Suitable resin particles to employ may be either thermoplastic or thermosetting so long as the particles exhibit a thermoplastic stage during which coalescence and fusion of the particles into a smooth coating on heated articles takes place. Specific illustrative resin materials to employ in particle form are polyethylene, polystyrene, blends of epoxy resin, epoxy-reactive hardeners, and accelerators to promote cure of the epoxy resin and hardener mixture, etc. Generally, the particle size of the fluidizable powder should be small enough to pass through a screen of about 40 mesh, and may be so small as to pass through 200 mesh, or even smaller (e.g., minus 325 mesh).

It will be noted by referring to the drawing that container 11 is divided into an upper chamber 13 and a lower chamber 14 separated by elements which for convenience may be called at this point a porous diaphragm 15. The diaphragm 15 is flexible and possesses little resistance against deformation in the package article described. For that reason, a removable relatively-stiff structural member 16 (suitably of corrugated cardboard) is placed over diaphragm 15 before the bag 12 of resin particles is inserted in the upper chamber of container 11 in forming the package article. Member 16 is in the shape of a disc in the preferred embodiment of the package illustrated, and serves in conjunction with other relatively rigid parts of container 11 to protect diaphragm 15 against damage during storage and shipment of the composite package.

Container 11 is adapted to be used to form an aerator. It has a base member 17, side walls 18, diaphragm 15 dividing it into the upper chamber 13 and lower chamber 14, a tapered spout member 23, and supporting means 19 located within the lower chamber intermediate the side walls thereof to support the flexible diaphragm 15 in spaced relationship from the base member 17. Supporting means 19 suitably may take the form of a ring of a piece of relatively stiff paperboard having apertures 20 or other large openings in it so as to allow for free movement of gases through it and ultimately through substantially all areas of diaphragm 15.

The flexible porous membrane 15 is composed of two layers, one being a screen 21 (suitably of nylon for high tensile strength) and the other a porous paper membrane 22 suitably of kraft paper, which possesses desired porosity as a membrane to permit air of gas passage without permitting solid material passage, but is weak in tensile strength and tear resistance). It will be appreciated that the nylon screen and kraft paper together are flexible and cannot alone be relied upon as structural strength members. Supporting means 19 for the diaphragm 15 serves as a structural reinforcement or support.

Communicating with lower chamber 14 of container 11 is the spout member 23, suitably depending centrally from base member 17 as illustrated in the drawing. This spout member is preferably tapered, as illustrated, so that it may be adapted as a fitting for hoses of varied diameter. Since it is designed to be cut at its end before affixing a hose, its end may be sealed in the package article of the invention.

A cover 24 is provided for container 11 and contributes to resistance of the unitary package against damage during handling incident to shipment and storage.

In manufacturing container 11, it is suitable to fabricate walls 18 from fiber body sheets, commonly known as can and tube stock. A cylindrical member having an inside diameter of about 7 inches may be wound from such stock to a thickness of about ⅛ inch, and then cut to length to form inner wall 25 of the upper chamber 13 of container 11 as well as the bottom ring 26, which constitutes the inner wall of lower chamber 14 of container 11. Outer wall 27 of container 11 may suitably be formed of the same or similar cylindrically would stock generally at a thickness of only about ¹⁄₁₆ inch.

A disc base member 17, suitably of tin plate stock, is crimped along its peripheral edges to an end of outer wall 27, as for example illustrated in detail in FIGURE 1. Spout member 23, suitably of polyethylene or other plastic, in inserted in a concentrically located hold formed in base member 17 and fixed in position. While adhesive cement may be used to secure the spout member in position, it is suitable also to rely upon a tight fitting between the spout member and the hole of the base member (with base member 17 "biting" into the plastic of the spout member) as means for holding the spout member in position. Next, support means 19, suitably of cardboard, is adhesively affixed to base member 17; and bottom ring 26 of the inner wall of the container is slipped into position and glued. Discs of nylon screening and porous kraft paper (e.g., 60 pound kraft) are adhesively affixed at their peripheries to the bottom ring 26 of the inner wall and rest upon support member 19. Generally, adhesive (e.g., animal glue) should be liberally applied around the periphery of the porous members 21 and 22 for securing the same to the inner wall of container 11. Next, the inner wall assembly 25 for the upper chamber is inserted into position and adhesively secured. Finally, a protective removable disc of corrugated cardboard 16 is dropped in the container, the bag of fusible uncured resin particles 12 placed therein, and cover member 24, formed of a short cylinder of the outer wall stock having a disc suitably of tin plate crimped to one end thereof, is slipped on the top of the container.

Enclosing container 11 and its resin particles is a corrugated cardboard carton 10 which, in the embodiment illustrated, has four elongated substantially rectangular side panels joined along their longitudinal edges. These side panels are joined at their ends with substantially square top and bottom panels to form the carton. Of course, the carton is preferably formed by appropriately folding a patterned flat sheet of corrugated cardboard, and securing flaps in position. Container 11 rests in the carton upon supporting means 29 (only one of two such means being shown in FIG. 1). Supports 29 may be formed, as is preferred, by appropriately folding a flap of the corrugated carton itself. When such is done, a carton pattern is selected which has extensions at the end of two opposite side wall panels, and these extensions are folded as at 30, 31 and 32 into the supporting members 29, which serve as spacers between base 17 of container 11 and the bottom of carton 10. Spacing members 29 hold spout member 23 free of compression contact against the bottom of the carton, and therefore protect it against damage during shipment. Additionally, the two supporting members 29 serve as supports for container 11 after the package is converted into a fluidized bed.

Above container 11 are damping pads or spacers 33 which fill the space between the cover of container 11 and the top of the carton. They serve in combination with cover 24 (and support members 29) to prevent damage to container 11 and its contents during shipment.

About the intermediate portion of the carton, somewhere between the top panel and above the area of supports 29 (generally located in the upper ⅔ of the carton) is provided a tear strip 34 which extends along a line parallel with the bottom of the carton and about the interior of the carton. The tear strip affords ready access to the interior of the carton as well as an assured means for opening of the carton without destroying the carton and rendering it useless as a support for the container 11 during fluidized bed use. It is of importance that the tear strip be located above support members 29 and preferably above the position of diaphragm 15 of container 11 within the carton, so that a sufficient length of each side panel of the carton below the tear strip line will remain after stripping so as to serve as an aid for holding container 11 in place after the assembly is converted to a fluidized bed.

In the lower part of the carton, below the tear strip line, is a scored marking for a portal for use in gaining access to the lower portion of the carton in the area below base member 17 of container 11 (and therefore below the uppermost portion of support spacers 29).

In use, a customer receiving the packaged article of the invention will remove the top portion of the carton free of the bottom portion thereof after pulling tear strip 34. Then he removes the cover of container 11, the bag of resin 12, and removable support disc 16. He selects a hose for connection to an air fitting (not shown), and then cuts the end of tapered spout 23 leaving a diameter for the spout appropriate for the diameter of the hose selected. The hose is then affixed to the cut end of spout 23, scored member 35 crushed inwardly or outwardly of the bottom portion of the carton to provide a portal therethrough, and the hose entrained from the tapered spout through the scored portal opening 35 to the air source. Container 11 is rested upon support members 29 and also given some support by the portion of the side panels of carton 10 remaining after stripping tear strip 34. Resin from bag 12 is poured in the top chamber 13 of container 11 and air turned on just sufficiently to cause the resin powder in the container to assume the appearance of a simmering liquid. Articles to be coated with the resin are then heated to a temperature above the melting point or thermoplastic point of the particles in the fluidized bed, and dipped therein to accomplish coating.

That which is claimed is:

1. A package convertible to form a fluidized bed comprising a container having an upper and lower chamber separated by a flexible air-permeable diaphragm affixed along its edges to side walls of said container, uncured resin particles adapted to be fused into a homogeneous mass on heating in said upper chamber, a spout adapted for communication with said lower chamber, and means within said lower chamber intermediate the side walls thereof to support said diaphragm in spaced relationship from the base of said container.

2. A package adapted to be converted into a fluidized bed comprising a base member, side walls connected to said base member to form a container, a flexible air-permeable diaphragm affixed along its edges to said side walls and in spaced relation from said base member so as to separate said container into an upper chamber and lower chamber, uncured resin particles adapted to be fused into a homogeneous mass on heating in said upper chamber, a spout adapted for communication with said lower chamber, and means within said lower chamber intermediate the side walls of said container to support said flexible diaphragm in spaced relationship from said base member without obstructing gaseous flow from said lower chamber through substantially all areas of said diaphragm.

3. A unitary package article adapted to be converted into a fluidized bed for coating heated articles by dipping therein, said article comprising an outer paperboard carton, a container having an upper and lower chamber wholly enclosed within said carton, and a bag of fusible uncured finely-divided resin particles in the upper chamber of said container, said container comprising a base member, side walls connected to said base member, a flexible air-permeable diaphragm affixed along its edges to said side walls in spaced relation from said base member so as to form the upper chamber and lower chamber of said container, a spout adapted for communication with said lower chamber, and means within said lower chamber intermediate said side walls to support said flexible diaphragm in spaced relationship from said base member without obstructing gaseous flow from said lower chamber through substantially all areas of said diaphragm.

4. A package convertible to form a fluidized bed, said package comprising an elongated corrugated cardboard carton having elongated side panels joined along their longitudinal edges, and having top and bottom panels joined with the ends of said elongated side panels to form an enclosed carton chamber, a tear strip located substantially parallel with the base of said carton in approximately the upper two-thirds portion of said side panels and adapted upon stripping to permit easy removal of the upper portion of said carton, means below said tear strip to make a portal through the lower portion of said carton, and a container enclosed within said carton, said container comprising side walls formed of paper stock, a base member secured to one end of said side walls, a flexible air-permeable diaphragm within said container affixed along its peripheral edges to said side walls in spaced relationship from said base member and dividing said container into an upper and lower chamber, a tapered spout depending from said base member and adapted to provide a means for gaseous communication into the lower chamber of said container, means within said lower chamber intermediate the side walls thereof to support said flexible diaphragm interiorly of its affixation to said side walls and in spaced relationship from said base member without obstructing gaseous flow from said lower chamber through substantially all areas of said diaphragm, a bag of fusible uncured resin particles in the upper chamber of said container, a cover over the upper chamber of said container, and means within said carton for supporting the base of said container in sufficient spaced relationship from the bottom panel of said carton to leave the end of said spout member free of compression contact against the bottom panel of said carton.

References Cited in the file of this patent
UNITED STATES PATENTS 2,969,038    Neumann _____ Jan. 24, 1961